US009950941B2

(12) United States Patent
Johnston

(10) Patent No.: US 9,950,941 B2
(45) Date of Patent: Apr. 24, 2018

(54) APPARATUS FOR MEASURING GLASS GOBS

(71) Applicant: Owens-Brockway Glass Container Inc., Perrysburg, OH (US)

(72) Inventor: Karl C Johnston, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 407 days.

(21) Appl. No.: 14/639,240

(22) Filed: Mar. 5, 2015

(65) Prior Publication Data
US 2016/0257594 A1 Sep. 8, 2016

(51) Int. Cl.
| G03B 7/00 | (2014.01) |
| C03B 7/00 | (2006.01) |
| G01P 3/36 | (2006.01) |
| G01P 3/68 | (2006.01) |
| G01P 5/00 | (2006.01) |
| G01B 11/04 | (2006.01) |
| G01B 11/00 | (2006.01) |

(52) U.S. Cl.
CPC .............. *C03B 7/005* (2013.01); *G01B 11/00* (2013.01); *G01B 11/043* (2013.01); *G01P 3/36* (2013.01); *G01P 3/68* (2013.01); *G01P 5/00* (2013.01)

(58) Field of Classification Search
CPC .......... G01B 11/02; G01B 11/00; G01B 11/24
See application file for complete search history.

(56) References Cited

U.S. PATENT DOCUMENTS

| 2,963,821 A | 12/1960 | Baker |
| 3,850,607 A | 11/1974 | Cook |
| 4,015,967 A | 4/1977 | Ward, Jr. |
| 4,108,623 A | 8/1978 | Cardenas-Franco |
| 4,145,204 A | 3/1979 | Farkas et al. |
| 4,145,205 A | 3/1979 | Farkas et al. |
| 4,162,909 A | 7/1979 | Peters |
| 4,169,909 A | 10/1979 | Milne |

(Continued)

FOREIGN PATENT DOCUMENTS

| DE | 10312550 | * | 7/2004 | ............... C03B 7/00 |
| DE | 10312550 B3 | | 7/2004 | |

(Continued)

OTHER PUBLICATIONS

PCT International Search Report and Written Opinion, Int. Application No. PCT/US2016/020822, Int. Filing Date: Mar. 4, 2016, Applicant: Owens-Brockway Glass Conatiner Inc., dated Jun. 1, 2016.

*Primary Examiner* — Luke D Ratcliffe

(57) ABSTRACT

An apparatus for measuring speed, the length and elongation of a molten glass gob travelling along a defined path includes at least two optical detectors. A mask having at least two openings through which light passes to each of the optical detectors is disposed adjacent the optical detectors. A lens receives light from the moving glass gob and focuses such light through the openings of the mask. Electronics are coupled to each of the optical detectors for determining the speed of the molten glass gob as a function of timing of light sensed at the optical detectors. In exemplary embodiments of the disclosure, the optical detectors is disposed within the image plane of the lens and comprise different portions of a single light sensing device.

15 Claims, 3 Drawing Sheets

(56) References Cited

U.S. PATENT DOCUMENTS

| | | | |
|---|---|---|---|
| 4,205,973 A | 6/1980 | Ryan | |
| RE30,998 E | 7/1982 | Peters | |
| 4,338,116 A | 7/1982 | Huff et al. | |
| 4,357,157 A | 11/1982 | Cardenas-Franco et al. | |
| 4,375,669 A | 3/1983 | Johnson et al. | |
| 4,382,810 A | 5/1983 | Wood | |
| 4,469,501 A | 9/1984 | Kingsbury et al. | |
| 4,574,009 A | 3/1986 | Welker | |
| 4,604,122 A | 8/1986 | Keller | |
| 4,636,238 A | 1/1987 | Sidler | |
| 4,654,066 A | 3/1987 | Garcia et al. | |
| 4,682,998 A | 7/1987 | Ayala-Ortiz | |
| 4,708,727 A | 11/1987 | Cardenas-Franco et al. | |
| 4,708,729 A | 11/1987 | Cardenas-Franco et al. | |
| 4,876,652 A | 10/1989 | Gardner | |
| 4,877,436 A | 10/1989 | Sheinkop Isac | |
| 4,928,027 A | 5/1990 | Deininger et al. | |
| 4,978,859 A * | 12/1990 | Ransheim | |
| 5,266,093 A | 11/1993 | Konishi et al. | |
| 5,434,616 A | 7/1995 | Anger et al. | |
| 5,499,055 A | 3/1996 | Anger et al. | |
| 5,649,593 A | 7/1997 | Yamaguchi et al. | |
| 5,746,798 A | 5/1998 | Menzie | |
| 6,007,873 A | 12/1999 | Holcombe, Jr. et al. | |
| 6,099,978 A | 8/2000 | Sekhar | |
| 6,212,909 B1 | 4/2001 | Leidy et al. | |
| 6,446,788 B1 | 9/2002 | Leidy et al. | |
| 7,350,379 B2 | 4/2008 | Ueda et al. | |
| 7,587,913 B2 | 9/2009 | Yamagata et al. | |
| 2012/0200857 A1* | 8/2012 | Sharpe | G01N 15/1404 356/436 |

FOREIGN PATENT DOCUMENTS

| | | |
|---|---|---|
| EP | 0873975 A2 | 10/1998 |
| WO | WO 92/20994 | 11/1992 |

\* cited by examiner

APPARATUS FOR MEASURING GLASS GOBS

The present disclosure relates to an apparatus for measuring the speed and length of a glass gob travelling through a glassware forming machine.

BACKGROUND AND SUMMARY OF THE DISCLOSURE

Gobs of glass are molten and emit light. In this state, the glass gobs are rapidly sent through assemblies used to position and form the glass gobs into a desired article. If the speed with which the glass gobs travel through the assembly line are estimated incorrectly, inaccuracies in the forming of the articles desired, and quite possibly the waste of raw materials, may occur. Therefore, a general object of the present disclosure is to provide an apparatus for measuring the speed of molten glass gobs travelling along the glassware forming system.

An apparatus for measuring speed of a molten glass gob travelling along a defined path includes an optical detector. A mask having at least two openings through which light passes to the optical detector is disposed adjacent the optical detector. A lens receives light front the moving glass gob and focuses such light through the openings of the mask. Electronics are coupled to the optical detectors for determining the speed of the molten glass gob as a function of timing of light sensed at the optical detectors. In illustrative embodiments of the disclosure, the optical detector is disposed within the image plane of the lens and comprise different portions of a single light sensing device.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Figure 1:
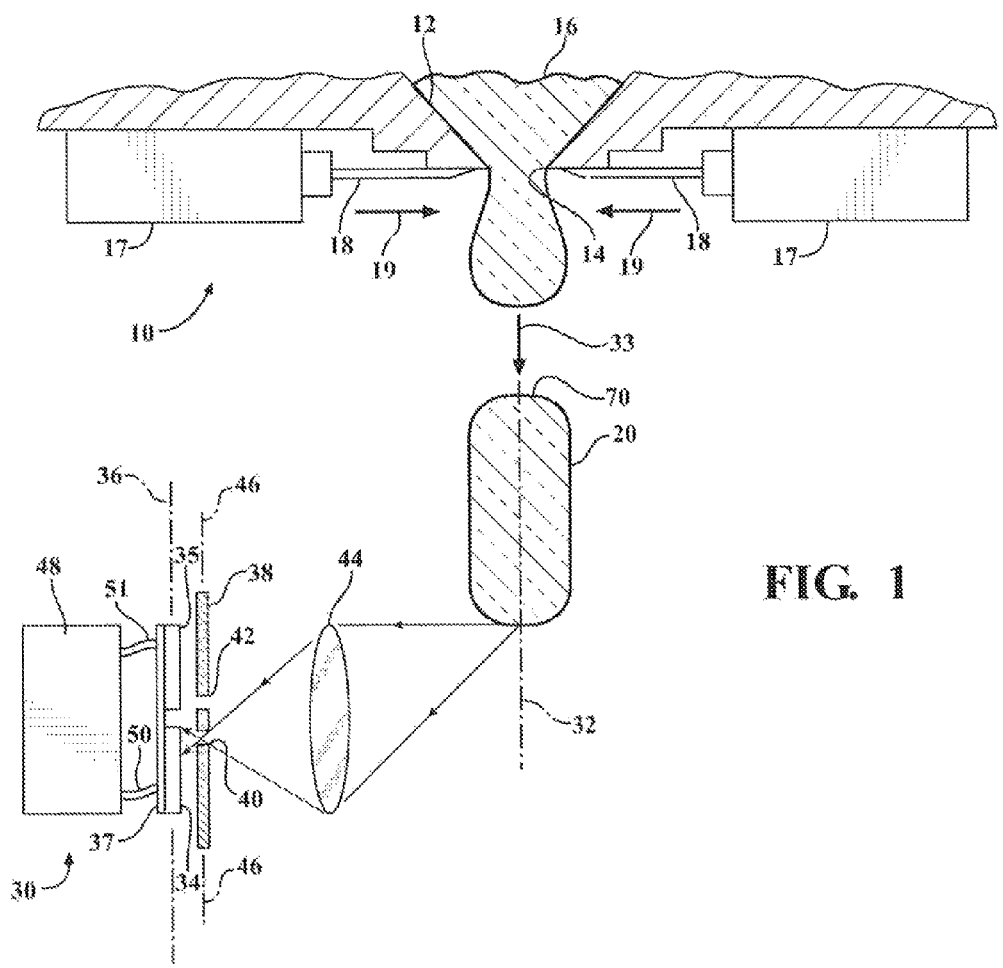
FIG. 1 is a cross-sectional side view of an apparatus that creates glass gobs and incorporates one embodiment of the disclosure.

FIG. 1 illustrates a gob distributor, generally indicated at 10 having a funnel 12 and outlet 14. Molten glass 16 is released through the outlet 14 in a calculated fashion. A shear mechanism 17 is operatively connected to the gob distributor 10 directly below the outlet 14. The sheer mechanism 17 shears the molten glass 16 as it exits the outlet 14 by moving sheers 18 in an inward direction 19. By shearing the molten glass 16 as it exits the gob distributor 10, a glass gob 20 is created. The glass gob 20 falls from the gob distributor 10. The glass gob 20 is then directed through a series of funnels, spindles, scoops, troughs, and the like, to reach the molding section of the operation (none of these elements are shown in this Figure for purposes of simplicity).

When the glass is in a molten state, it is hot, and therefore emits black body electromagnetic radiation in the infrared and visible spectrums. As such, the molten glass 16 and glass gobs 20 are hot and emit light. The emission of light can be used to assist in the calculation of physical parameters of a glass gob 20 as is moves from the gob distributor 10 to the mold section of the operation.

In one embodiment of the invention, generally indicated at 30, the physical parameter measured is the speed of the glass gob 20 as it travels along a defined path, represented by a dashed line 32 in the direction of arrow 33. It may be appreciated by those skilled in the art that the defined path 32 extends through a straight path or through a curved path depending on the configuration of the mold section with respect to the gob distributor 10.

The apparatus 30 includes first 34 and second 35 optical detectors. The optical detectors 34, 35 may be disparate devices or, as shown in FIG. 1, they may be different portions of a single light sensing device 37. The actual configuration of the optical detectors 34, 35 may depend upon design parameters of the apparatus 30. An example of optical detectors 34, 35 that are used with the apparatus 30 include a single CMOS or CCD light detector element, two or more individual detector elements with one behind each opening in a mask (discussed subsequently), or a detector array situated such that individual pixels are only illuminated by light from one opening in the mask. The pair of optical detectors 34, 35 define an axis 36. The axis 36 may be parallel to the defined path 32 through which the molten glass gob 20 travels, at least while the glass gob 20 is proximate the optical detectors 34, 35.

The apparatus also includes a mask 38 disposed adjacent the pair of optical detectors 34, 35. The mask 38 includes a pair of openings 40, 42 through which light passes to each of the pair of optical detectors 34, 35. The mask 38 is opaque and prevents radiation in the infrared and visible spectrums from passing therethrough but for the openings 40, 42, which do allow radiation in these spectrums to pass.

The apparatus 30 also includes a lens 44 having a defined image plane 46, represented by dashed lines in FIG. 1. The lens 46 receives the light from the molten glass gob 20 and focuses the light to its image plane 46. The mask 38 is disposed at the image plane 46 such that they are coplanar. As such, the lens 44 focuses the light to the mask 38 allowing the light to pass in a focused manner through the openings 40, 42.

The apparatus 30 also includes electronics 48 that are coupled to each of the pair of optical detectors 34, 35. In FIG. 1, the coupling is represented by lead contacts 50, 51. It should be appreciated by those skilled in the art that the coupling of the electronics 48 to the pair of optical detectors 34 may include systems that are wired or wireless, depending on the needs of the apparatus 30 in the particular environment in which it is being placed vis-à-vis the gob distributor 10.

The electronics 48 determine the speed of the molten glass gob 20 as a function of timing of the light sensed at the pair of optical detectors 34. By way of example, and to be in no way limiting, the electronics 48 would include a voltage amplifier and an analog-to-digital converter (ADC) for each of the pair of optical detectors 34, 35. The analog signals received by the pair of optical detectors 34, 35 would be amplified and converted to digital signals. Each of the ADCs would send its respective digital signal to a microprocessor. The microprocessor would detect when the digital signals would cross set thresholds, described in greater detail below, calculate time differences between threshold crossings, and calculate the speed of the glass gob 20. It may be appreciated by those skilled in the art that the microprocessor may also calculate the acceleration of the glass gob 20 as it moves past the measuring apparatus 30. Alternatively, the electronics 48 may include any other suitable electrical or electronic components suitable for calculating the speed of an object by detecting light generated thereby or reflected off of the object, and using those detected events to calculate speed.

Figure 2:
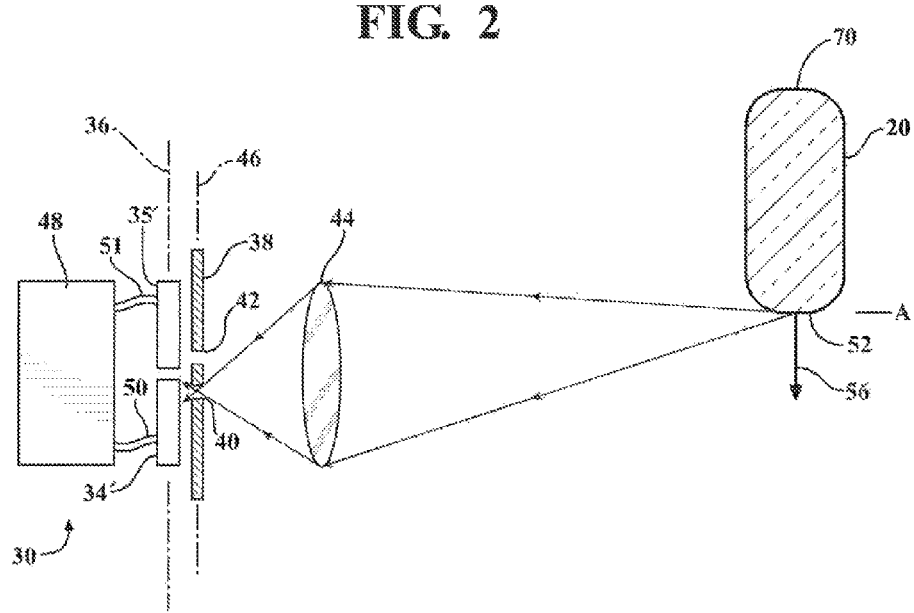
FIG. 2 is a schematic representation of one embodiment of the disclosure with light ray representation of the initial glass gob leading edge detection.
Figure 3:
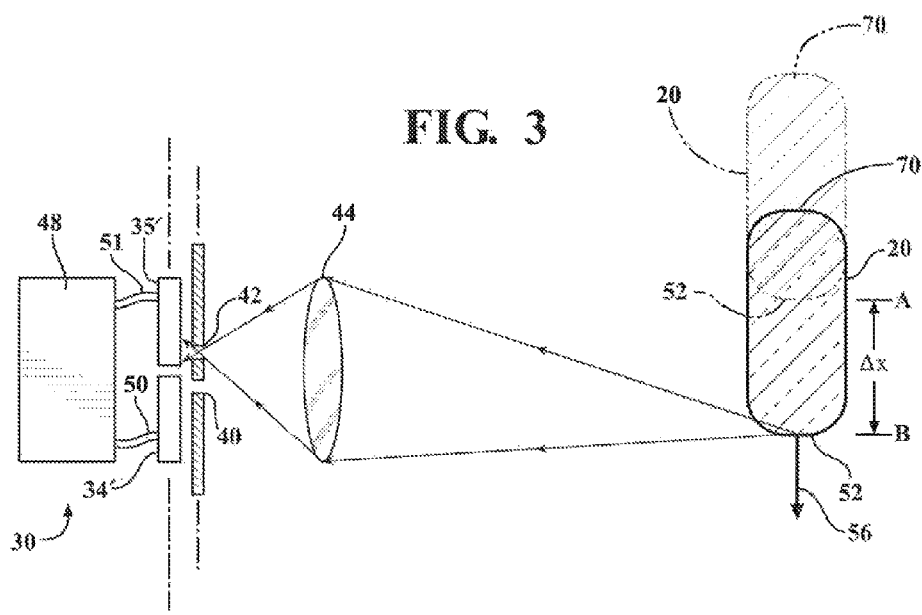
FIG. 3 is a schematic representation of one embodiment of the disclosure with light ray representation of a second or subsequent detection of a leading edge of a glass gob.

Referring to FIGS. 2 and 3, graphic representations of a glass gob 20 as it moves from the gob distributor 10 are shown with respect to the apparatus 30. FIGS. 2 and 3 show the progression of the glass gob 20 as it moves from having its leading edge 52 in a first position A to having its leading edge 52 in a second position B, respectively, with the difference being labeled as Δx. The lens 44 collects light emitted by the glass gob 20. At a particular point of time as represented in FIG. 2, the leading edge 52 of the glass gob 20 is at a position A at which the emitted light is collected by the lens 44 and is focused through the opening 40 of the mask 38 to be received by one 34' of the pair of optical detectors 34, 35'. (The optical detectors 34, 35' are shown as disparate devices as an alternative embodiment to the detector configuration of FIG. 1.) This triggers a first pulse 54, shown in FIG. 4. As the glass gob 20 moves in the direction represented by arrow 56, the light emitted by the leading edge 52 of the glass gob 20 at a second position B is received by the lens 44, which may focus that light on the second optical detector 35 as the light passes through the second opening 42 of the mask 38. As is represented in FIG. 3, the leading edge 52 of the glass gob 20 has moved a distance Δx from the first position A at which the light was received by the first optical detector 34 to the second position B at which the light was received by the second optical detector 35 (the glass gob 20 is shown in both the first position A (in phantom) and second position B in FIG. 3). The detection of the light by the second optical detector 35 is represented by a second pulse 58, shown in FIG. 4. The pulsed signals 54, 58 are received by the electronics 48, which calculates the speed of the glass gob 20 therefrom based on the time difference between the pulses and the distance between first 34 and second 36 optical detector and the focal length of the lens 44.

Figure 4:
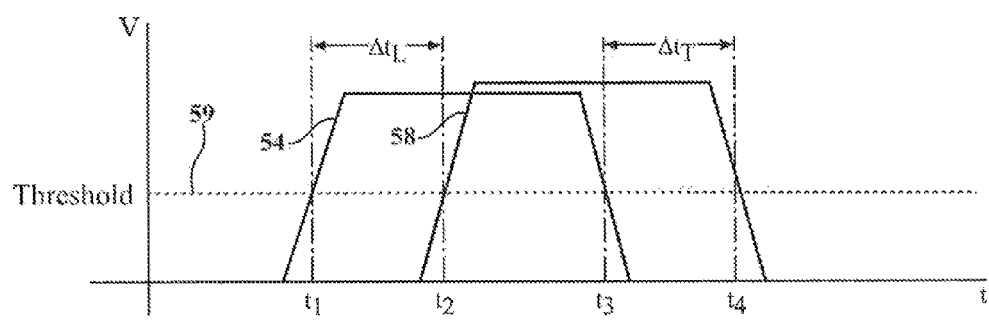
FIG. 4 is a graphic representation of a voltage signal output of each of the two detectors incorporated into one embodiment of the disclosure.

Referring to FIG. 4, either the optical detectors 34, 35 of FIG. 1 or the optical detectors 34', 35' of FIGS. 2 and 3 create pulsed signals 54, 58 of a defined voltage. When the first pulse 54 is received from the first optical detector 34 and exceeds a predetermined threshold 59, a first time $t_1$ is measured. When the second pulse 58 is received from the second optical detector 35, a second time $t_2$ is measured when it exceeds the same predetermined threshold 59. The difference between the times $(t_2-t_1)$ in which the first pulse 54 and second pulse 58 pass the predetermined threshold 59 is the time difference $\Delta t_1$, that is used to calculate the speed of the glass gob 20.

Therefore, by knowing the distance between the first position A and the second position B, Δx (|A−B|), that the leading edge 52 of the glass gob 20 travelled in order for the lens 44 to focus light onto each of the pair of optical detectors 34, 35 with respect to the difference in time $\Delta t_L$ that it takes for this to occur, the speed of the glass gob 20 may be calculated.

Another physical parameter of the glass gob 20 that can be measured by the apparatus 30 is the length of the glass gob 20. Again referring to FIG. 4, as the body of the glass gob 20 travels past the two positions A and B, the amplitude of the first pulse 54 from the first optical detector 34 and the amplitude of the second pulse 58 from the second detector 35 remain fairly constant. When the trailing edge 70 of the glass gob 20 has passed the first position A, there is no light being emitted so the amplitude of the first pulse 54 approaches zero. At the time that the pulse 54 falls below a predetermined threshold, it is measured as $t_3$. As the trailing edge 70 of the glass gob 20 passes the second position B, again, no light is emitted because the glass gob 20 has passed; therefore, the amplitude of the second pulse 58 approaches zero. At the time that the pulse 58 falls below a predetermined threshold, it is measured as $t_4$. The difference between the times $(t_4-t_3)$ which the first pulse 54 and second pulse 58 fall below the predetermined threshold 59 is the time difference $\Delta t_T$ that can also be used to calculate the speed of the glass gob 20 as the trailing edge 70 travels from the first position A to the second position B, a distance shown as Δx. By comparing the $\Delta t_L$ of the leading edge 52 to the $\Delta t_T$ of the trailing edge 70, as the entire glass gob 20 passes the locations A, B, it can be determined if the length of the glass gob 20 has changed (elongated or compressed) during travel.

The length of the glass gob 20 can be determined from the difference in the time when the first detector 34 detects the light emitted from the leading edge 52 (shown as $t_1$ in FIG. 4) and the time when the first detector detects the lack of light from the trailing edge 70 (shown as $t_3$ in FIG. 4). The total amount of time that light is emitted from the glass gob 20 is detected by the first detector as $t_3-t_1$. This relationship is used to determine the glass gob length L. Further, the length L of the glass gob 20 can be determined using the total time that light from the glass gob 20 is detected by the second detector as $t_4-t_2$. The amount of elongation of the glass gob 20, a third physical parameter, can be determined by comparing the length of the glass gob 20 determined by the first detector 34 to the length of the glass gob 20 determined by the second detector 35. Any number of additional detectors could be utilized to provide additional speed and length data.

Figure 5:
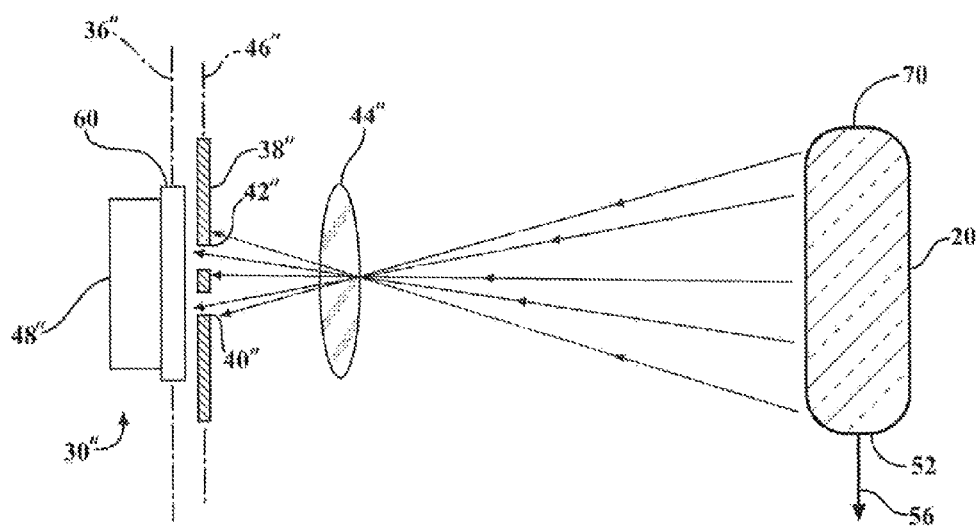
FIG. 5 is a schematic representation of a second embodiment of the disclosure using a single detector.

Referring to FIG. 5, a second embodiment of the invention is shown wherein like double primed reference characters represent similar elements as those described above. The invention 30" uses a single optical detector 60 (in place of the two optical detectors 34, 35 and 34', 35') to measure the speed and length of the glass gob 20. The single optical detector 60 is disposed adjacent the mask 38" having two openings 40", 42". As the glass gob 20 travels past the openings 40", 42" in the mask 38", the amount of light detected by the optical detector 60 waxes, reaches a plateau and then wanes, as shown generally in FIG. 6. As the light from the leading edge 52 of the glass glob 20 passes through the first opening 40", a pulse, generally shown at 62, is created (shown in FIG. 6) having an initial amplitude that may reach a first plateau 64. When the glass gob 20 moves in the direction of the arrow 56, such that the light from the leading edge 52 also passes through the second opening 42", the voltage output for the optical detector 60 increases, which is represented by an increase in the pulse amplitude at 66. As the pulse amplitude 62 increases at 66, it passes a second threshold 59b. The first 59a and second 59b thresholds are predetermined values defined as a function of the general size and temperature of a standard molten glass gob 20. If the glass gob 20 is of such a length that the light emitted from the body is detected by the optical detector 60 through both openings 40", 42", a plateau 74 will be reached. With further travel, when the glass gob 20 reaches such a distance that the light from the trailing edge 70 has passed beyond the position of being captured by the single optical detector 60 through the first opening 40", the amplitude of the pulse 62 begins to wane or drop at 68, and the amplitude may reach a plateau at 69 when the light of the body of the glass gob 20 prior to the trailing edge is only being detected by the second detector 42. As the glass gob 20 continues to travel, and the light from the trailing edge 70 or end of the glass gob 20 is directed by the lens 44 such that the light does not pass through the first opening 4", it is no longer captured d by the single optical detector 60 through the second opening 42", the amplitude of the pulse 62 drops further at 72 until such time that no light is captured by the apparatus 30". The electronics 48", similar to those described above, would include a microprocessor that would calculate the length and speed of the glass gob 20.

Figure 6:
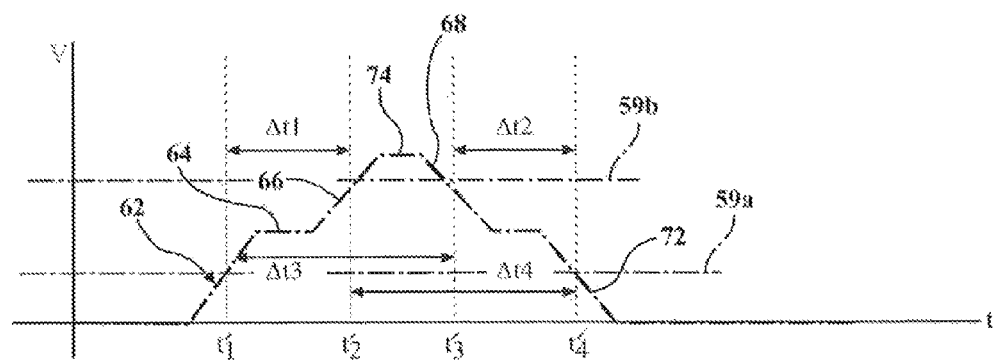
FIG. 6 is a graphic representation of a voltage signal output of the detector incorporated into the second embodiment of the disclosure.

Referring to FIG. 6, the time difference for the pulse 62 to pass between the first threshold 59a (representing light being received from the leading edge 52 of the glass gob 20) and the second threshold 59b (representing light being received from more than just the leading edge 52 of the glass gob 20) is identified as Δt1. The time difference for the pulse 62 to pass between the first threshold 59a and the second threshold 59b after the pulse 62 passes a peak plateau 74 (representing light from the leading edge 52 of the glass gob 20 not being received by the apparatus 30") is identified as Δt3. Δt3 is the total time in which light is being received by the body of the glass gob 20. The time difference for the pulse 62 to pass from the second threshold 59b (representing light from the trailing edge 70 of the glass gob 20 beginning to not be received by the apparatus 30") is identified as Δt2. And the time difference for the pulse 62 to pass between the second threshold 59b while it is increasing in amplitude and the first threshold 59a while the pulse amplitude 72 is decreasing is identified as Δt4. By measuring either the time differences Δt3 or Δt4, the length of the glass gob 20 can be determined, when the characteristics of the lens 44" (focal length) are known.

There thus has been disclosed an apparatus for measuring the length and speed of a glass gob that fully satisfies all of the objects and arms previously set forth. The apparatus has been disclosed in conjunction with an exemplary embodiment, and a number of modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. Apparatus for measuring speed of a molten glass gob travelling along a defined path, said apparatus comprising:
   at least two optical detectors to sense light;
   a mask having at least two openings through which light passes to said optical detector;
   a lens for receiving light from the molten glass gob and focusing such light through said openings of said mask; and
   electronics coupled to each of said optical detectors for determining at least one physical parameter of the molten glass gob as a function of timing of light sensed at said at least two optical detectors, wherein the at least one physical parameter includes elongation of the molten glass gob, and further wherein said electronics are configured to determine a first length of the molten glass gob as a function of timing of light sensed by a first of said at least two optical detectors, a second length of the molten glass gob as a function of timing of light sensed by a second of said at least two optical detectors, and the elongation of the molten glass gob based on the determined first length of the molten glass gob and the determined second length of the molten glass gob.

2. The apparatus set forth in claim 1 wherein said mask is disposed at an image plane of said lens.

3. The apparatus set forth in claim 1 wherein said pair of optical detectors define an axis parallel to the defined path through which the molten glass gob travels.

4. The apparatus set forth in claim 1 wherein said pair of optical detectors comprise different portions of a single light sensing device.

5. The apparatus set forth in claim 1 wherein each of said optical detectors creates a pulsed signal identifying the detection of the travelling of the molten glass gob therepast.

6. The apparatus of claim 5 wherein said electronics receives the pulsed signals and calculates the determined speed therefrom.

7. The apparatus of claim 6 wherein each of said optical detectors generates one of the pulsed signals upon detection of a leading edge of the molten glass gob.

8. The apparatus of claim 1 wherein each of said optical detectors is spaced from each other a predetermined distance.

9. The apparatus of claim 1 wherein the at least one physical parameter measured also includes a speed of the glass gob.

10. Apparatus for measuring speed of a molten glass gob travelling along a defined path, said apparatus comprising:
    an optical detector;
    a mask having an opening through which light passes to said optical detector;
    a lens for receiving light from the molten glass gob and focusing such light through said opening of said mask; and
    electronics coupled to said optical detector for determining at least one physical parameter of the molten glass gob as a function of timing of light sensed at said optical detector, wherein the at least one physical parameter includes elongation of the molten glass gob, and further wherein said electronics are configured to determine a first length of the molten glass gob as a function of timing of light sensed at said optical detector, a second length of the molten glass gob as a function of timing of light sensed at said optical detector, and the elongation of the molten glass gob based on the determined first length of the molten glass gob and the determined second length of the molten glass gob.

11. The apparatus of claim 10 wherein said optical detector includes at least two disparate regions of optical sensing.

12. The apparatus of claim 10 wherein said optical detector includes more than two disparate regions of optical sensing.

13. Apparatus for measuring a length of a molten glass gob travelling along a defined path, said apparatus comprising:
    an optical detector;
    a mask having at least two openings through which light passes to said optical detector;

a lens for receiving light from the molten glass gob and focusing such light through said openings of said mask; and electronics coupled to said optical detector for measuring the time in which said detector receives light from each of said at least two openings, wherein said electronics are configured to determine a first length of the molten glass gob as a function of timing of light received by said optical detector from a first of said at least two openings, a second length of the molten glass gob as a function of timing of light received by said optical detector from a second of said at least two openings, and an elongation of the molten glass gob based on the determined first length of the molten glass gob and the determined second length of the molten glass gob.

14. The apparatus set forth in claim 13 wherein said mask is disposed at an image plane of said lens.

15. The apparatus set forth in claim 13 wherein said optical detector defines an axis parallel to the defined path through which the molten glass gob travels.

* * * * *